Feb. 23, 1960  E. P. ANDERSON  2,926,320
TEMPERATURE MEASURING DEVICE
Filed Jan. 31, 1957

INVENTOR.
EDWARD P. ANDERSON
BY
ATTORNEYS

United States Patent Office 2,926,320
Patented Feb. 23, 1960

2,926,320
TEMPERATURE MEASURING DEVICE

Edward P. Anderson, Livingston, N.J., assignor, by mesne assignments, to Engelhard Industries, Inc., Newark, N.J., a corporation of New Jersey Application January 31, 1957, Serial No. 637,481

2 Claims. (Cl. 338—31)

The present invention deals with a temperature measuring device and more particularly with a transducer means for surface pyrometry.

It is an object of the present invention to provide a novel means for measuring the surface temperature of a body. It is another object of this invention to provide a transducer means for surface pyrometry including means whereby said transducer is adapted for bonding to a body surface for the measurement of the temperature thereof. Other objects and advantages will become apparent from the description hereinafter following and the drawings forming a part hereof, in which.

According to the invention, the measuring device or transducer comprises a support member in the form of a grid or screen having suitable openings or apertures therethrough and temperature responsive means, e.g. wire, connected to said support and whereby said openings operate as a means through which a cement or bonding agent is enabled to tenaciously bond the support, including said temperature responsive means, to the surface of a body and to maintain the bond under variable temperature conditions.

Figure 1:
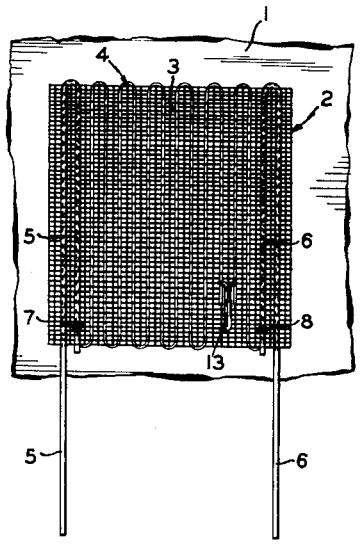
Figure 1 illustrates a schematic elevational view of the temperature measuring device according to this invention as shown on a fragmentary portion of a surface.

Referring to Figure 1, a body, e.g. a metal body 1, is provided with a temperature measuring means generally referred to by the numeral 2, and which comprises a grid 3 of insulation material and in the form of a perforated sheet, or screen, or in the form of a woven fabric with a temperature responsive means 4, such as wire, secured over an area of said grid preferably by interlacing or interweaving the wire onto said grid. The temperature responsive wire 4 is electrically conductive and advantageously comprises platinum wire to which electrical leads 5 and 6 are connected such as at 7 and 8, for example, by welding the leads at the opposite end portions of said wire 4 and with the wire 4 sinuously formed onto grid 3 over an area between the leads 5 and 6. The leads 5 and 6 are advantageously composed of the same metal as the wire 4.

Figure 2:
Figure 2 illustrates an enlarged fragmentary view of a component of Figure 1.

Figure 2 illustrates the particular structure of the wire 4 and shows such wire as a composite member having a core 9 of insulating material such as a strand or yarn of glass fibres or filaments, e.g. fused quartz yarns, and over which is helically wound an electrically conductive wire 10. The core 9 functions to maintain the helical winding of the wire 10, and the wound form of the wire 10 is essential in providing an increased conductive surface area for improved response of the temperature measuring means 2 and it also functions to permit a flexing or bending of the composite wire 4 without a strain effect in the wire 10.

While the wire 4 may be interlaced through the apertures of an apertured grid, e.g. an apertured mica grid, the preferred form of temperature measuring means 2 comprises a woven fabric composed of substantially parallel glass or fused quartz yarns or strands interwoven with sinuous loops of the wire 4 and wherein the wire 4 is in the form of either the woof or warp strands of the woven fabric. In order to provide suitable anchoring of the lead wires 5 and 6, such wires are formed into a loop or loops along a portion of their lengths with the loop being substantially co-extensive with the loops of wire 4 and having legs 5' and 6' to which wire 4 is connected as at 7 and 8.

Figure 3:
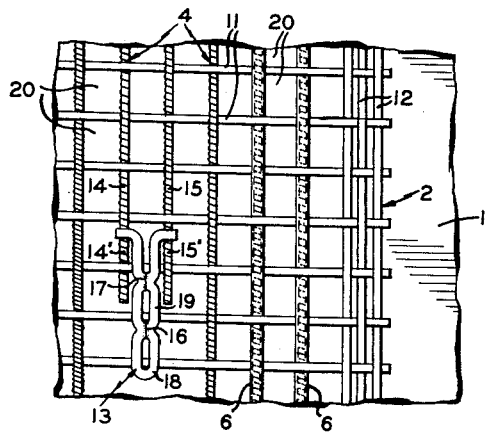
Figure 3 illustrates an enlarged fragmentary view of Figure 1 showing another embodiment thereof.

Figure 3 illustrates the woven fabric according to the invention and shows the conductive wire 4 interwoven with the glass or fused quartz strands generally indicated as strands 11. In order to maintain the weave of the fabric, the fabric is provided with a selvage at the end portions thereof by interweaving strands 12 of a composition similar to strands 11 and warp-wise or woof-wise thereof.

In providing a number of such measuring means 2 in the form of woven fabric, it is somewhat difficult to maintain exactly reproducible electric characteristics. The invention contemplates to provide a compensator means 13 whereby adjustment is possible to provide for desired electrical resistance of the measuring means. The compensator 13 is in the form of a loop of conductive wire welded or otherwise connected across a pair of legs 14 and 15 of the loops of wire 4. Having so connected the compensator loop 13, the loop is short circuited along its length, e.g. by welding, such as at 16 and 17, until a reading on a potentiometer connected to leads 5 and 6 indicates the desired resistance of the measuring means. Having established the desired resistance, the non-effective lengths 18 and 19 of compensator 13 and non-effective lengths of legs 14 and 15, as at 14' and 15', may be cut off.

The completed transducer, as illustrated by Figure 1, is applied by cementing it to a metal body 1, whereby the apertures generally indicated as 20 enable the cement or other bonding agent to tenaciously bond the transducer to the surface of the body 1 and to maintain the bond under variable temperature conditions.

What I claim is:

1. A temperature measuring device comprising a grid member, a temperature responsive wire in the form of sinuous loops secured over an area of said grid, said wire being a composite wire consisting of an insulating core with a conductive wire helically wound thereon, and lead wires connected to said temperature responsive wire, a resistance compensating means connected across a pair of legs of said loops.

2. A temperature measuring device comprising a grid member, said grid member being a woven fabric in which one group of the woof group and warp group strands comprises strands of insulating material and the other group comprises sinuous loops of temperature responsive wire, said wire being a composite wire consisting of an insulating core with conductive wire helically wound thereon, and lead wires connected to said temperature responsive wire, a resistance compensating means connected across a pair of legs of said loops.

References Cited in the file of this patent

UNITED STATES PATENTS

| | | |
|---|---|---|
| 1,860,541 | Hebler | May 31, 1932 |
| 2,251,697 | Van Daam et al. | Aug. 5, 1941 |
| 2,336,834 | Bakke | Dec. 14, 1943 |
| 2,375,997 | Larson | May 15, 1945 |
| 2,582,341 | Levers et al. | Jan. 15, 1952 |
| 2,717,945 | Dresios et al. | Sept. 13, 1955 |
| 2,724,759 | Daniels | Nov. 22, 1955 |
| 2,842,648 | Reynolds | July 8, 1958 |

FOREIGN PATENTS

| | | |
|---|---|---|
| 526,596 | Great Britain | Sept. 20, 1940 |